US009654970B2

(12) United States Patent
Yoon et al.

(10) Patent No.: US 9,654,970 B2
(45) Date of Patent: May 16, 2017

(54) METHOD AND DEVICE FOR WEB REDIRECT AUTHENTICATION IN WIFI ROAMING BASED ON AC AND AP INTERWORKING

(75) Inventors: Joo Young Yoon, Seoul (KR); Kyu Jeong Han, Suwon-si (KR); Yung Ha Ji, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 14/345,538

(22) PCT Filed: Oct. 19, 2011

(86) PCT No.: PCT/KR2011/007775
§ 371 (c)(1),
(2), (4) Date: Mar. 18, 2014

(87) PCT Pub. No.: WO2013/039278
PCT Pub. Date: Mar. 21, 2013

(65) Prior Publication Data
US 2014/0359740 A1 Dec. 4, 2014

(30) Foreign Application Priority Data
Sep. 16, 2011 (KR) .................. 10-2011-0093278

(51) Int. Cl.
*H04W 12/06* (2009.01)
*H04W 8/02* (2009.01)
(Continued)

(52) U.S. Cl.
CPC ......... *H04W 12/06* (2013.01); *H04L 63/0876* (2013.01); *H04W 8/02* (2013.01);
(Continued)

(58) Field of Classification Search
CPC .. H04L 61/6013; H04W 12/06; H04W 84/12; H04W 8/02
(Continued)

(56) References Cited

U.S. PATENT DOCUMENTS 7,020,685 B1 * 3/2006 Chen ............... H04W 88/02
455/403
7,343,158 B2 * 3/2008 Mizell ............. H04W 8/065
370/338
(Continued)

FOREIGN PATENT DOCUMENTS

| GB | EP 2405678 A1 * | 3/2010 |
| KR | 10-2005-7017103 A1 | 12/2005 |
| KR | 10-2004-0117730 A | 7/2006 |

OTHER PUBLICATIONS

RFC 2866—RADIUS Accounting—Network Working Group—Copyright (C) The Internet Society (2000).*
(Continued)

*Primary Examiner* — Linglan Edwards
*Assistant Examiner* — William B Jones
(74) *Attorney, Agent, or Firm* — Sughrue Mion, PLLC

(57) ABSTRACT

A WiFi roaming management method and device which redirect an HTTP request of a mobile terminal from an AP to an AC even though the AC and the AP do not exist in the same subnet, which redirects a source IP address for an HTTP request, after transferring, to an IP address of the AC, and which smoothly support a wireless Internet service in a distributed processing system according to a web authentication of the AC in a WiFi roaming method is provided. A terminal session management function and a traffic control function are separated by a premium AC (Access Controller) and a premium AP (Access Point) interworked with a tunneling method according to a CAPWAP protocol.

11 Claims, 4 Drawing Sheets

(51) Int. Cl.
  *H04L 29/06* (2006.01)
  *H04W 84/12* (2009.01)
  *H04L 29/12* (2006.01)
  *H04W 8/12* (2009.01)
(52) U.S. Cl.
  CPC ...... *H04L 61/6013* (2013.01); *H04L 61/6022* (2013.01); *H04L 63/0892* (2013.01); *H04W 8/12* (2013.01); *H04W 84/12* (2013.01)
(58) Field of Classification Search
  USPC ....... 370/338, 331, 329, 411, 237, 253, 254, 370/311, 312, 316, 389, 224
  See application file for complete search history.

(56) References Cited

U.S. PATENT DOCUMENTS

| | | | |
|---|---|---|---|
| 7,519,036 B2* | 4/2009 | Zhang | 370/338 |
| 2007/0153741 A1* | 7/2007 | Blanchette | H04L 45/66 370/331 |
| 2007/0233738 A1* | 10/2007 | Weinberger | G06F 17/30787 |
| 2008/0069024 A1 | 3/2008 | Iino | |
| 2008/0072047 A1 | 3/2008 | Sarikaya et al. | |
| 2010/0263022 A1* | 10/2010 | Wynn | H04W 12/06 726/3 |
| 2010/0325714 A1* | 12/2010 | Iyer | H04W 12/06 726/8 |
| 2011/0173682 A1* | 7/2011 | Perry | H04W 12/06 726/4 |
| 2013/0268666 A1* | 10/2013 | Wilson et al. | 709/225 |

OTHER PUBLICATIONS

Cisco, How does RADIUS Work?, Jan. 19, 2006, Cisco Inc. Document ID: 12433.*

International Search Report for PCT/KR2011/007775 dated Sep. 27, 2012.

\* cited by examiner

METHOD AND DEVICE FOR WEB REDIRECT AUTHENTICATION IN WIFI ROAMING BASED ON AC AND AP INTERWORKING

CROSS-REFERENCE TO RELATED APPLICATION

This application is a national stage entry of the PCT application no. PCT/KR2011/007775 filed on Oct. 19, 2011, which claims the benefit of priority from Korean Patent Application No. 10-2011-0093278, filed on Sep. 16, 2011 in the Korean Intellectual Property Office, the disclosures of which are incorporated herein by reference in their entirety.

BACKGROUND

1. Field

Exemplary embodiments broadly relate to a method and device for managing WiFi roaming, and more particularly, to a method and device for managing WiFi roaming, in which, a station session management function and a traffic control function are separated by a access controller (AC) and a access point (AP) operating in conjunction with each other using a tunneling method according to a Control and Provisioning of Wireless Access Points (CAPWAP) protocol, the AP redirects an HTTP request of a mobile station to the AC even when the AC and the AP are not present in the same subnet (in the case of a routed connection), with the source IP address of the HTTP request having been replaced with the IP address of the AC, thereby smoothly supporting a wireless Internet service in a distributed processing method via web authentication at the AC.

2. Description of the Related Art

A wireless fidelity (WiFi) roaming system is a type of wireless local area network (WLAN) based on the IEEE 802.11a/b/g/n standards, and provides a high-speed wireless data service to mobile stations within a specific distance from an access point (AP), which is a wireless access point device.

In a WiFi roaming method using such an AP, the AP is generally responsible for both a station session management function and a traffic control function according to a lightweight access point protocol (LWAPP). However, due to the introduction of a CAPWAP protocol, an AC is made to be responsible for a station session management function while operating in conjunction with an AP using a tunneling method, and thus the load of the AP is reduced, thereby enabling a high-speed wireless data service to be provided to a mobile station.

In an existing method in which an AP is responsible for both a station session management function and a traffic control function, a station and the AP are present in the same subnet, and thus a station is authenticated using a source media access control (MAC) address in response to a hypertext transfer protocol (HTTP) request from the station. In contrast, in an environment in which a routed connection is present between an AC and an AP, when a web authentication method in which an HTTP request is redirected to an AC is used, the source MAC information of the HTTP request is replaced with the MAC information of a recent hop router, and thus a problem arises in that it is difficult to determine a station that has made an HTTP request.

SUMMARY

Accordingly, aspects of exemplary embodiments is to provide a method and device for managing WiFi roaming in which a station session management function and a traffic control function are separated by a AC and a AP operating in conjunction with each other using a tunneling method according to a CAPWAP protocol. The AP redirects an HTTP request of a mobile station to the AC even when the AC and the AP are not present in the same subnet, with the source IP address of the HTTP request having been replaced with the IP address of the AC. Accordingly, a wireless Internet service is smoothly supported in a distributed processing method via web authentication at the AC.

In accordance with an aspect of exemplary embodiments, a method of managing WiFi roaming via an access controller (AC) on a network is provided. The AC operating in conjunction with an access point (AP) supports a wireless Internet service for a mobile station. The method includes redirecting an HTTP request of a mobile station from the AP to a web server over the network, where in the HTTP request, a source IP address is replaced with an IP address of the AC, in response to the redirecting; requesting, by the web server, authentication by transmitting, to the AC, login information (including a user ID, a password, etc.), including a MAC address of the mobile station received in such a way that the web server requests the MAC address from the mobile station, and performing, by the AC, control via MAC address authentication of the mobile station through communication with an authentication server over the network so that the authentication server starts accounting, and permitting, by the AC, association of the mobile station with the AP.

In the method of managing WiFi roaming, prior to the HTTP request from the mobile station, the AC receives from the AP an association request of the mobile station, in response to the association request, assigns the IP address to the mobile station, and in response to receiving a failure notification from the authentication server for the MAC address authentication of the mobile station through communication with the authentication server, the AP may redirect the HTTP request to the web server.

In this method, the web server may transmit to the mobile terminal a web authentication box adapted for input of the login information and may receive from the mobile station a selection of a box included in the web authentication box, wherein the selected box provides information for a limited association of the mobile station to uniform resource locators (URLs) indicated in the selected box, and permitting, by the AP, the association of the mobile station with the URLs indicated in the selected box regardless of the MAC authentication of the authentication server even when there is no entry of login information.

The web server may manage location-based URLs specific to a location of the AP, and may include the location-based URLs of the AP in the selected box permitting a limited association between the mobile station and the location-based URLs.

In accordance with yet another aspect of exemplary embodiments, there is provided an access controller (AC) which supports management of WiFi roaming while operating in conjunction with an access point (AP) which supports a wireless Internet service for a mobile station over a network. The AC includes a receiver configured to receive a request for authentication when authentication is requested by transmitting login information, including a MAC address of the mobile station, received in such a way that the web server requests the MAC address from the mobile station, and in response to redirecting an HTTP request of the mobile station from the AP to a web server over the network with a source IP address of the HTTP request replaced with an IP address of the AC; and an authenticator configured to perform control via MAC address authentication of the mobile station through communication with an authentication server over the network so that the authentication server starts accounting, and configured to permit association of the mobile station with the AP.

Prior to the HTTP request from the mobile station, the authenticator is further configured to receive, from the AP, an association request from the mobile station, and to assign the IP address to the mobile station, and to receive a failure notification from the authentication server in response to the MAC address authentication of the mobile station through communication with the authentication server, and in response to the failure notification, the AP may redirect the HTTP request to the web server.

The AC may further include an accounting processor. The accounting processor is configured to transmit to the authentication server accounting information, received from the AP connected to the mobile station, and the authentication server may process the statistics of the received accounting information for the mobile station.

In accordance with the WiFi roaming management method and device of exemplary embodiments, a station session management function and a traffic control function are separated by a AC and a AP operating in conjunction with each other using a tunneling method according to a CAPWAP protocol. When a distributed processing method distributes traffic load in which user traffic, which is generated when a mobile station uses an Internet service, can be transmitted and received over a network including an L2 switch, a router, etc. without passing through the AC. In a method and a device according to exemplary embodiments, the AP redirects an HTTP request of a mobile station to the AC even when the AC and the AP are not present in the same subnet, with the source IP address of the HTTP request having been replaced with the IP address of the AC, thereby smoothly supporting a wireless Internet service via web authentication at the AC.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Although exemplary embodiments will be described in detail below with reference to the accompanying drawings and descriptions in the accompanying drawings, the inventive concept is not limited or restricted by the exemplary embodiments, and shall be construed as including all permutations, equivalents, and substitutes covered by various exemplary embodiments.

Figure 1:
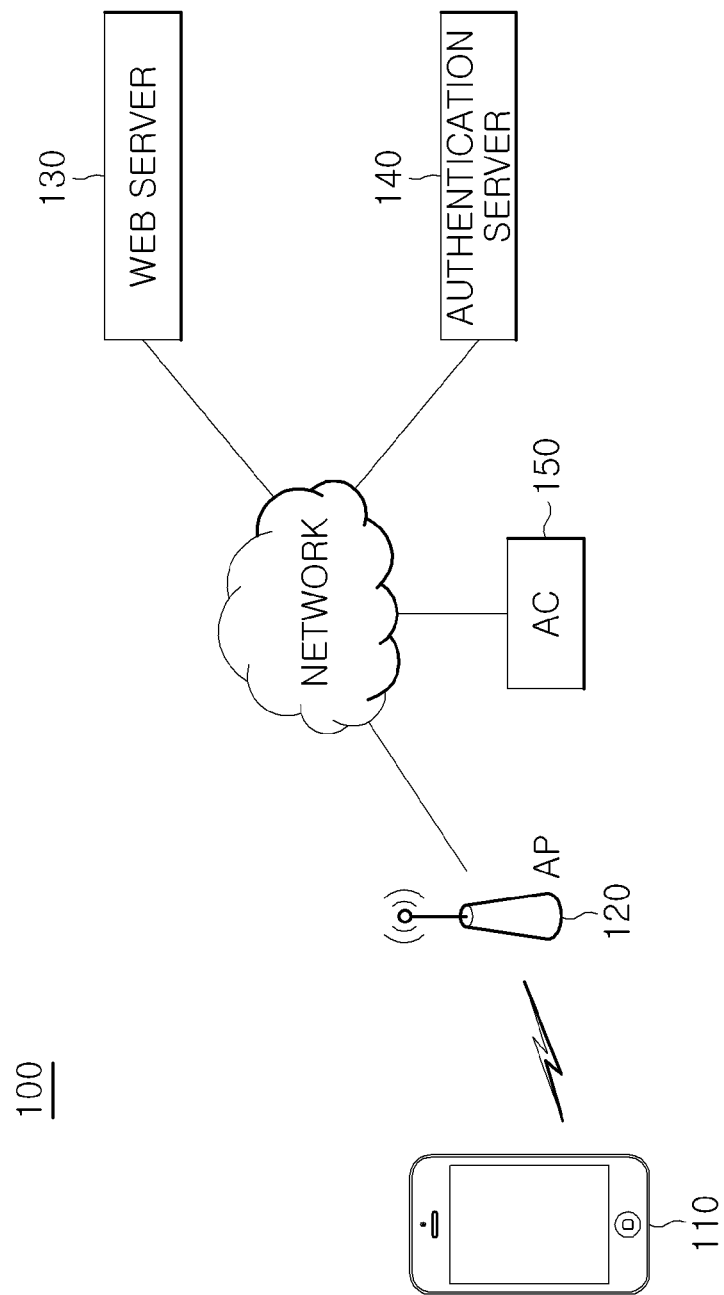
FIG. 1 is a diagram illustrating a communication system for managing WiFi roaming according to an exemplary embodiment.

FIG. 1 is a diagram illustrating a communication system 100 for managing WiFi roaming according to an exemplary embodiment.

Referring to FIG. 1, the communication system 100 for managing WiFi roaming according to an exemplary embodiment includes a mobile station 110, a wireless access point (AP) 120, a web server 130, an authentication server 140, and an access controller (AC) 150. These apparatuses include a number of hardware and software components.

The wireless AP 120, the web server 130, the authentication server 140, and the AC 150 operate in conjunction with each other on a network. The mobile station 110 may access the network with the support of the wireless Internet service of the AC 150 and the AP 120 that operate in conjunction with each other over the network in a tunneling manner in accordance with a control and provisioning of wireless access points (CAPWAP) protocol, may communicate with another user station or an Internet server, and may receive a necessary data service. To support the wireless Internet service, the AP 120 is responsible for a traffic control function and the AC 150 is responsible for a station session management function, thereby reducing the load of the AP 120 required for WiFi roaming. The network may be the Internet, and the network may include a wireless mobile communication network, such as a WCDMA or WiBro network, that is operated by a mobile communication service provider, or a wired telephony network.

Figure 2:
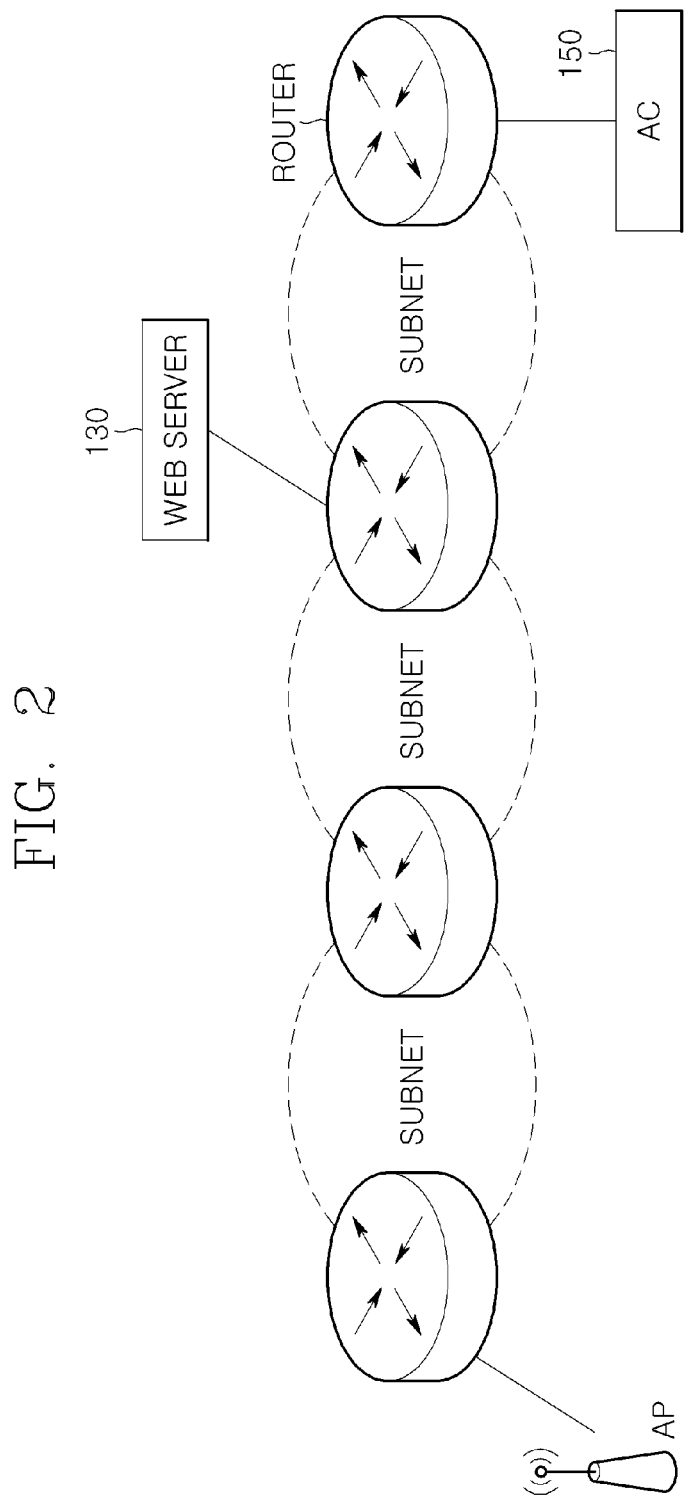
FIG. 2 is a diagram illustrating an environment in which the AC and AP are not present in the same subnet according to an exemplary embodiment.

The AC 150 and the wireless AP 120 may be present in the same subnet that is under the routing control of the same router according to an exemplary embodiment. Alternatively, as illustrated in FIG. 2 in accordance with another exemplary embodiment, the AC 150 may be present in a different subnet that is under the routing control of other routers connected to a subnet to which the wireless AP 120 is connected. The web server 130 may also be present in the same subnet as the AC 150, or may be present in a subnet different from that of the AC 150 in the routed connection of the network.

The authentication server 140 corresponds to an authentication and accounting server that performs services, such as remote authentication dial-in user services (RADIUS) responsible for authentication and accounting on a mobile communication network. The authentication server 140 may manage the Media Access Control (MAC) addresses of subscriber mobile stations in a database which includes a memory, may initiate accounting when succeeding in MAC address authentication in response to a request from the AC 150, may receive accounting-related information from the AC 150 during the service period of the mobile station 110, and may process accounting statistics.

In an exemplary embodiment, the mobile station 110 is a station that may access a network, for example, the Internet, via wireless APs in accordance with a Wireless Fidelity (WiFi) protocol and use a data service. The mobile station 110 may be a smart phone, such as an iPhone or an Android phone, but is not limited thereto. The mobile station 110 may be a portable or mobile station, such as a cellular phone or a personal communications services (PCS) phone capable of communication via wireless APs, and a synchronous/asynchronous international mobile telecommunication-2000 (IMT-2000) phone, a personal digital assistant (PDA), a wireless application protocol (WAP) phone, a mobile play station, or a portable multimedia player configured to communicate wireless. The mobile station 110 may be a notebook personal computer (PC), a desktop PC, or a palm PC. In another exemplary embodiment, the mobile station 110 may be one of various household or business electronic appliances and devices configured to communicate with other electronic appliances.

When the AC 150, which supports WiFi roaming while operating in conjunction with the AP 120 on the network, assigns an internet protocol (IP) address and also controls association with the APs 120 while mediating the authentication of the mobile station 110 between the mobile station 110 and the authentication server 140, as described by way of an example above, both the traffic of control/data channels used to perform the above-described session management (authentication, accounting, etc.) and user traffic generated when the mobile station 110 uses an Internet service may be transmitted and received through the AC 150 according to a central processing method. In contrast, in an exemplary embodiment, according to a distributed processing method for distributing traffic load, user traffic, generated by the mobile station 110 using an Internet service, is directly transmitted and received through a network including an L2 switch, a router, etc. without passing through the AC 150 and only the traffic of control/data channels used to perform session management is made to be transmitted and received through the AC 150, the AC 150 and the APs 120 are allowed to operate in conjunction with each other even when they are not present in the same subnet (in the case of a routed connection). Accordingly, the AP 120 redirects the HTTP request of the mobile station 110 to the AC 150. That is, the AP 120 redirects the HTTP request of the mobile station 110 to the web server 130 with the source IP address of the HTTP request replaced with the IP address of the AC 150, thereby being able to support a wireless Internet service via web authentication at the AC 150.

Figure 3:
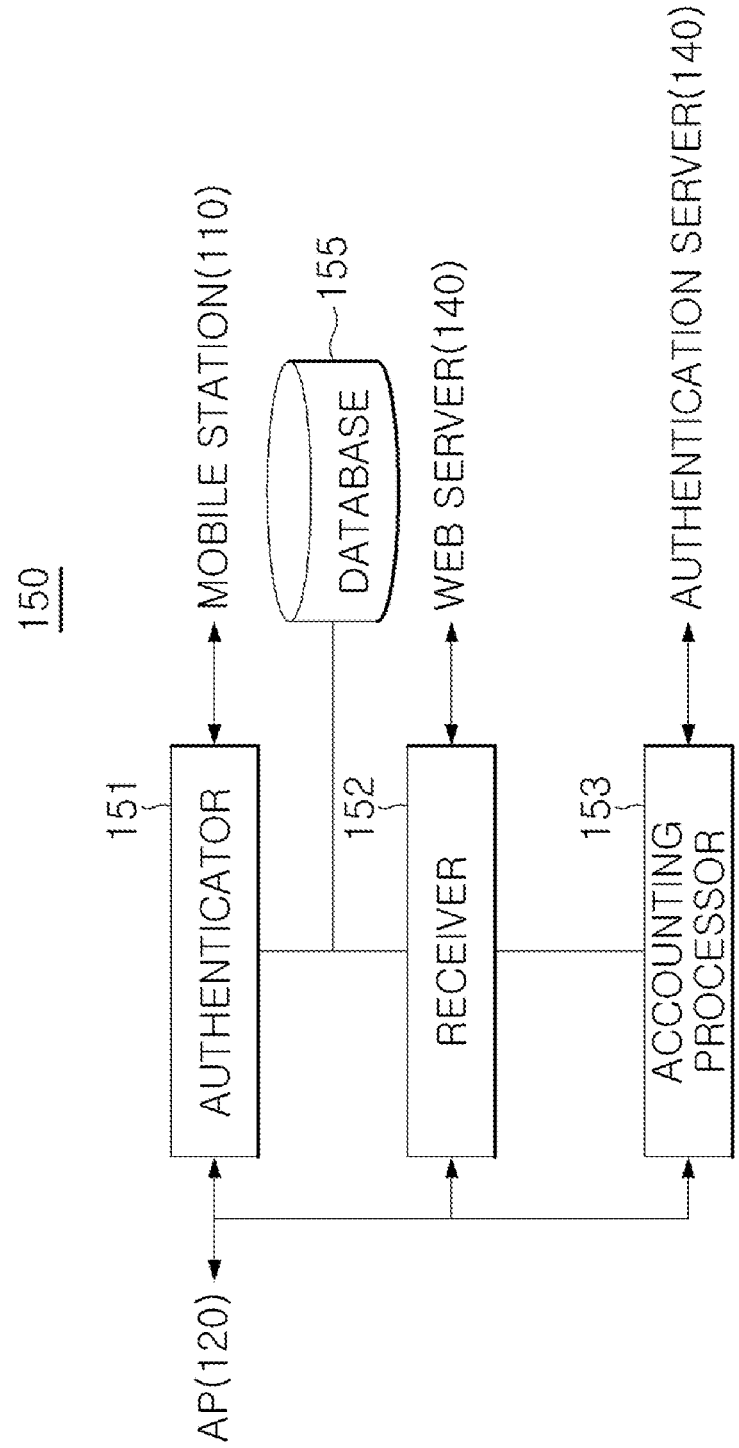
FIG. 3 is a diagram illustrating the configuration of the access controller (AC) according to an exemplary embodiment.

For this purpose, according to an exemplary embodiment, the AC 150 may be configured as illustrated in FIG. 3. Referring to FIG. 3, the AC 150, according to an exemplary embodiment, includes an authenticator 151, a receiver 152, an accounting processor 153, and a database 155 such as a memory. These components of the AC 150 may be implemented as software, hardware or a combination thereof. In an exemplary embodiment, only a minimum number of components are illustrated in order to illustrate principal functions.

The above-described exemplary operation of the AC 150 in the communication system 100 for managing WiFi roaming according to an exemplary embodiment will be described in brief with reference to FIG. 3. The detailed operation thereof in an exemplary embodiment will be described more specifically with reference to the flowchart of FIG. 4, as described below.

In FIG. 3, the authenticator 151 may receive a request for the association of the mobile station 110 from the AP 120 and assign an IP address to the mobile station 110. Even when an IP address has been assigned, a failure notification may be received from the authentication server 140 in an attempt to authenticate the Media Access Control (MAC) address of the corresponding mobile station through communication with the authentication server 140.

In this case, in an exemplary embodiment, the AP 120 may redirect an HTTP request (including a universe resource location (URL)) from the mobile station 110 to the web server 130 over the network. However, in this case, in an exemplary embodiment, the AP 120 may redirect the HTTP request to the web server 130 over the network, with the source IP address for the corresponding HTTP request having been replaced with the IP address of the AC 150.

Accordingly, when the web server 130 requests authentication by transmitting login information (a MAC address, an ID, a password, etc.) including the MAC address of the mobile station 110 received from the mobile station 110 by requesting the MAC address from the mobile station 110 via a web authentication box, the receiver 152 receives the login information (the MAC address, the ID, the password, etc.) transmitted from the web server 130. Through the authentication of the MAC address of the corresponding mobile station 110 in response to the request for authentication from the web server 130 via communication with the authentication server 140 over the network, the authenticator 151 performs control so that the authentication server 140 starts accounting, and allows the mobile station to access the AP 120.

The AP 120 accessed by the mobile station 110 may generate accounting information based on control traffic related to the connection and release of the mobile station 110, the AP 120 may transmit the accounting information related to the mobile station 110 to the AC 150, the accounting processor 153 may process the accumulation of the received accounting information, store the results of the processing in the database 155 and transmit the results to the authentication server 140 using a specific method, and the authentication server 140 may process the statistics of the received accounting information for each mobile station.

Figure 4:
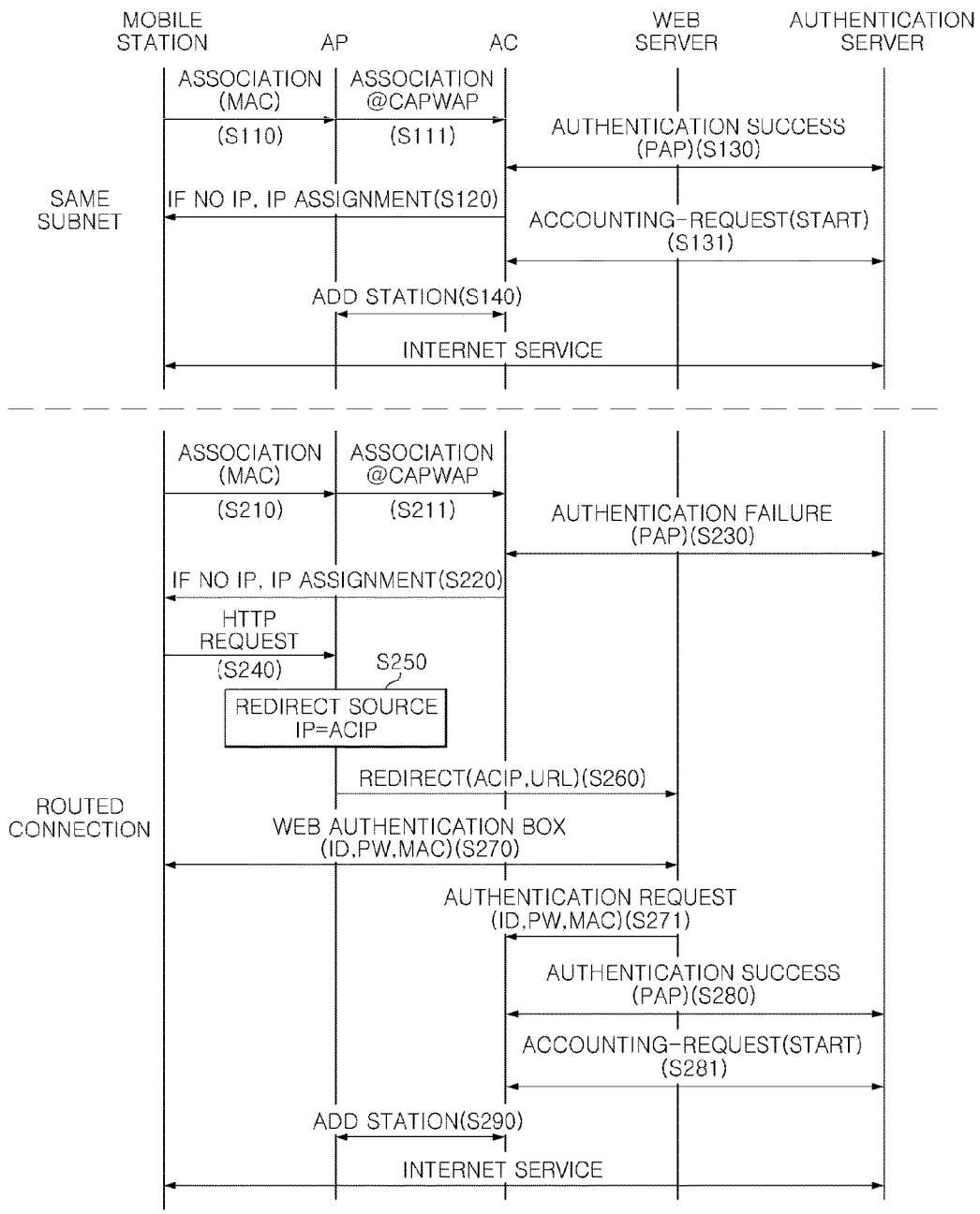
FIG. 4 is a flowchart illustrating a web redirect authentication method in a communication system for managing WiFi roaming according to an exemplary embodiment.

Referring to the flowchart of FIG. 4, a web redirect authentication method in the communication system 100 for managing WiFi roaming according to an exemplary embodiment will be described in detail.

First, when in the same subnet, the user of the mobile station 110 desires to use a wireless Internet service in an area where the wireless AP 120 has been installed, the mobile station 110 transmits an association request message to the AP 120 in operation S110 and the AP 120 transfers the association request message to the AC 150 in operation S111. The association request message includes the MAC address of the mobile station 110, and may further include parameters required for a request for a wireless Internet service, such as the MAC address of the destination such as the AP 120.

Accordingly, the authenticator 151 of the AC 150 determines whether roaming service is available (whether an association has already been allowed) for the mobile station 110 (using the MAC address) and assigns an IP address if there is no assigned IP address in operation S120. Next the authenticator 151 performs the authentication of the corresponding mobile station (e.g., MAC address authentication) through communication with the authentication server 140 over the network in operation S130. That is, the authenticator 151 of the AC 150 requests authentication by transmitting a message including the MAC address of the mobile station 110 to the authentication server 140, and the authentication server 140 may transmit a response of authentication success information to the AC 150 in accordance with a password authentication protocol (PAP) protocol if the corresponding information is included in MAC addresses for respective subscriber mobile stations managed in the database. Thereafter, in operation S131, the authentication server 140 transmits a message indicative of the start of accounting related to the mobile station 110 and receives a required response (an accounting request), thereby enabling accounting information to be accumulated in the accounting processor 153 of the AC 150 and then a notification is provided.

After the authenticator 151 of the AC 150 has performed control via the authentication of the corresponding mobile station 110 through communication with the authentication server 140 over the network so that the authentication server 140 starts accounting, as described above, according to an exemplary embodiment, messages adapted to allow the association of the mobile station 110 with an AP (e.g., 120) are exchanged (an ADD station) in operation S140, and thus the mobile station 110 may access the network via the AP 120 using the assigned IP address, thereby using a wireless Internet service. The authenticator 151 may store and manage information (e.g., a MAC address for each station or the like) about the mobile station whose association with the AP 120 has been allowed in the database 155.

Even when the AP 120 redirects an HTTP request to the AC 150 in the same subnet and authentication via the mediation of the web server 130 is not performed, as described above, according to an exemplary embodiment, the AC 150 easily performs the authentication of the MAC address of the mobile station 110 through communication with the authentication server 140 and thus there is no problem in performing control so that the mobile station 110 uses a wireless Internet service. When according to a distributed processing method for distributing traffic load, user traffic, which is generated when the mobile station 110 uses an Internet, is transmitted and received through a network including an L2 switch, a router, etc. without passing through the AC 150 and only the traffic of control/data channels used to perform session management is transmitted and received through the AC 150, the AP 120 redirects the HTTP request of the mobile station 110 to the AC 150. In an environment in which a routed connection is present between the AC 150 and the wireless AP 120, as illustrated in FIG. 2 according to an exemplary embodiment, the source MAC information of an association request from the mobile station 110, an HTTP request, etc. may be replaced with the MAC address of a recent hop router during transmission through routers and then the MAC address of the recent hop router may be reported to the AC 150. In an exemplary embodiment, the following procedure is performed so that an HTTP request is redirected to the web server 130 with the source IP address of the HTTP request replaced with the IP address of the AC 150 and so that a wireless Internet service is supported via web authentication at the AC 150.

In an exemplary embodiment, the mobile station 110 transmits an association request message to the AP 120 in operation S210, and the AP 120 transfers the association request message to the AC 150 in operation S211. The association request message includes the MAC address of the mobile station 110, and may include parameters required for a request for a wireless Internet service, such as the MAC address of the destination such as the AP 120.

Accordingly, in an exemplary embodiment, the authenticator 151 of the AC 150 determines whether roaming is available (whether an association has been already allowed) for the mobile station 110 (MAC address) and assigns an IP address if there is no assigned IP address in operation S220. The authenticator 151 of the AC 150 further authenticates the corresponding mobile station (e.g., MAC address authentication) through communication with the authentication server 140 over the network in operation S230. In this case, in an exemplary embodiment, the authenticator 151 of the AC 150 requests authentication by transmitting a message including the MAC address of a recent hop router to the authentication server 140, and the authentication server 140 may determine that the corresponding information is included in MAC addresses for respective subscriber mobile stations managed in the database and then transmit a response of authentication failure information to the AC 150 in accordance with a password authentication protocol (PAP) protocol. This may happen when there are multiple hops between routers because of the presence of a routed connection, the source MAC address of the association request message of the mobile station 110 has been replaced with the MAC address of a recent hop router and then notification thereof has been provided to the AC 150.

Although the authenticator 151 of the AC 150 has been assigned the IP address with respect to the association of the mobile station 110, as described above according to an exemplary embodiment, the authenticator 151 of the AC 150 may receive a failure notification from the authentication server 140 in an attempt at the Media Access Control (MAC) address authentication of the corresponding mobile station through communication with the authentication server 140.

In this case, in an exemplary embodiment, when the AP 120 receives an HTTP request (including a URL, etc.) from the mobile station 110 in operation S240, the AP 120 may redirect the HTTP request to the web server 130 over the network, in which case the AP 120 may redirect the HTTP request to the web server 130 over the network with the source IP address of the corresponding HTTP request replaced with the IP address of the AC 150 in operations S250 and S260. That is, the AP 120 inserts the IP address of the AC 150 as a source IP address rather than using its own IP address as a source IP address and then performs redirection to the web server 130, so that the web server 130 may mediate web authentication while using the IP address of the AC 150 as a destination in response to the redirection of the HTTP request transferred from the AP 120, as further described below. The redirect message transferred from the AP 120 to the web server 130 may include information required for authentication, such as the above-described source IP address (the IP address of the AC), the destination IP address (the IP address of the web server), the IP address of the mobile station 110, URL, etc.

Accordingly, in an exemplary embodiment, the web server 130 may transmit a web authentication box, etc. required for authentication to the mobile station 110, and the user may enter an ID and a password in the web authentication box, etc. of the mobile station 110, thereby enabling login information (the MAC address, the ID, the password, etc.) to be transmitted to the web server 130 in operation S270.

The web server 130 transmits an authentication request message, including the login information (the MAC address, the ID, the password, etc.) transmitted by the mobile station 110 as described above according to an exemplary embodiment, to the AC 150 in operation S271, and the receiver 152 of the AC 150 may receive the login information (the MAC address, the ID, the password, etc.) transmitted by the web server 130.

The authenticator 151 performs control so that the authentication server 140 starts accounting in operation S281 via the MAC address authentication of the corresponding mobile station 110 through communication with the authentication server 140 over the network in operation S280 in response to the request for authentication from the web server 130, and then allows the association of the mobile station with the AP 120 in operation S290.

That is, the authenticator 151 of the AC 150 requests authentication by transmitting a message including the MAC address of the mobile station 110 to the authentication server 140, and the authentication server 140 may transmit a response of authentication success information to the AC 150 in accordance with a password authentication protocol (PAP) protocol if the corresponding information is included in MAC addresses for respective subscriber mobile stations managed in the database. Thereafter, the authentication server 140 transmits a message indicative of the start of accounting related to the mobile station 110 and receives a required response (an accounting request), thereby enabling accounting information to be accumulated in the accounting processor 153 of the AC 150 and then a notification is provided.

After the authenticator 151 of the AC 150 has performed control via the authentication of the corresponding mobile station 110 through communication with the authentication server 140 over the network so that the authentication server 140 starts accounting as described above in an exemplary embodiment, messages adapted to allow the association of the mobile station 110 with an AP (e.g., 120) are exchanged (an ADD station) in operation S290, and thus the mobile station 110 may access the network via the AP 120 using the assigned IP address, thereby using a wireless Internet service. The authenticator 151 may store and manage information (e.g., the MAC address of the station or the like) about the station whose association with the AP 120 has been allowed in the database 155.

Meanwhile, in operation S270, the above-described web authentication box may include a box adapted to allow a limited association (the location-based URL of the AP), in addition to the box adapted to receive an ID, a password, etc. For example, the web server 130 may manage location-based URLs specific to the location of each AP 120. When the box is adapted to allow a limited association (including URLs based on the location of the AP or the like) is selected, the web server 130 may provide customized advertisements (for tourist spots, famous restaurants, traffic information, etc.) related to the location of the corresponding AP and webpages adapted to purchase or give customized discount coupons related to adjacent shops. When the box adapted to allow a limited association, which is included in the web authentication box, is selected, the AP 120 may allow the association of the mobile station with respect to URLs linked to the corresponding box regardless of no entry of login information, that is, regardless of the MAC authentication of the authentication server 140 (refer to in operation S280), thereby enabling the web server 130 to provide customized content as described above according to an exemplary embodiment.

Furthermore, in an exemplary embodiment, in the case where the mobile station 110 accesses the network via the AP 120 after web authentication, when the mobile station 110 is using a wireless Internet service, the AP 110 to which the mobile station 110 has been connected may generate accounting information based on control traffic related to the connection and release of the mobile station 110, the AP 110 may transmit accounting information related to the mobile station 110 to the AC 150, the accounting processor 153 may process the accumulated received accounting information, store the results of the processing in the database 155 and transmit the results of the processing to the authentication server 140 using a specific method, and the authentication server 140 may process the statistics of the received accounting information for the mobile station, although not illustrated in the drawings.

For example, in an exemplary embodiment, when the connection is released from the AP 120 to which the mobile station 110 was connected, accounting information related to the corresponding mobile station 110 may be generated and then transmitted to the AC 150. Alternatively, in an exemplary embodiment, when the mobile station 110 is connected to and released from a plurality of APs, each of the APs may generate accounting information and transmit the accounting information to the AC 150. In this case, the accounting processor 153 of the AC 150 may manage accounting information (information required for accounting, such as a station MAC address, dates, times, etc.) received from each of the APs and accumulate the received accounting information from various APs, and may transmit a minimum number of accounting messages to the authentication server 140 according to a predetermined notification method. For example, the accounting processor 153 may periodically transmit cumulative accounting information to the authentication server 140 at regular intervals (e.g., hourly, daily, weekly, or the like). In this case, the accounting processor 153 may directly check the intervals and transmit cumulative corresponding accounting information to the authentication server 140. In some cases, in an exemplary embodiment, when the authentication server 140 makes a request, the accounting processor 153 of the AC 150 may transmit cumulative accounting information to the authentication server 140 in response to the request. When the authentication server 140 receives cumulative accounting information from the accounting processor 153 of the AC 150, the authentication server 140 may manage accounting statistics information related to the number of packets used by processing statistics for each mobile station in accordance with the period of issuance of an accounting bill (e.g., each month). When necessary, accounting statistics information may be reported to a predetermined server that charges customers fees.

Although exemplary embodiments have been described with reference to the drawings, the inventive concept is not limited to the exemplary embodiments, and those having ordinary knowledge in the art to which the exemplary embodiments pertain may make various modifications and variations based on the above description of exemplary embodiments without departing from the technical ideas and scope of the inventive concept. Therefore, the scope of the inventive concept should not be defined only by the described exemplary embodiments, but should be defined by the following claims as well as their equivalents.

The invention claimed is:
1. A method of managing WiFi roaming comprising:
 receiving, at an access point (AP) which supports wireless Internet service for a mobile station, an HTTP request of the mobile station;
 redirecting, by the AP, the HTTP request of the mobile station from the AP to a web server over a network, wherein in the redirected HTTP request, a source IP address is replaced with an IP address of an access controller (AC) instead of an IP address of the AP;
 in response to said redirecting the HTTP request, receiving, by the web server, a MAC address of the mobile station from the mobile station, and requesting authentication by transmitting to the AC corresponding to the replaced source IP address, login information comprising the MAC address of the mobile station;
 performing, by the AC, control via MAC address authentication of the mobile station through communication with an authentication server over the network such that the authentication server starts accounting in response to the MAC address of the mobile station received by the authentication server from the AC being found in a database at the authentication server;
 permitting, by the AC, association of the mobile station with the AP based on said performing control via the MAC address authentication; and
 receiving, by the authentication server via the AC, accounting information from the AP to which the mobile station is connected and processing, by the authentication server, statistics of the received accounting information for the mobile station.

2. The method of claim 1, wherein, prior to the HTTP request from the mobile station, the AC receives, from the AP, an association request of the mobile station, and in response to the association request, the AC assigns the IP address to the mobile station, and in response to receiving a failure notification from the authentication server for the MAC address authentication of the mobile station through communication with the authentication server, the AP performs said redirecting of the HTTP request to the web server.

3. The method of claim 2, wherein the authentication server and the AC are separate servers.

4. The method of claim 1, wherein the login information further comprises a user identifier (ID) and a password.

5. The method of claim 4, further comprising:
transmitting, by the web server, to the mobile station a web authentication box in which the login information is input;
receiving from the mobile station, a selection of a box included in the web authentication box, wherein the selected box provides information for a limited association of the mobile station to uniform resource locators (URLs) indicated in the selected box,
permitting, by the AP, the association of the mobile station to the URLs indicated in the selected box regardless of the MAC authentication of the authentication server even when there is no entry of login information.

6. The method of claim 5, wherein the web server manages location-based URLs specific to a location of the AP, and adds the location-based URLs of the AP in the selected box permitting limited association between the location-based URLs and the mobile station.

7. The method of claim 1, wherein the AC and the AP are in different subnets.

8. The method of claim 1, wherein the AC and the AP are connected to each other via the network comprising a plurality of subnets.

9. An access controller (AC) which supports management of WiFi roaming comprising:
a receiver configured to receive, from a web server, a request for authentication comprising login information with a MAC address of a mobile station which is received by the web server from the mobile station, in response to redirecting, by an access point (AP), an HTTP request of the mobile station from the AP to the web server in which a source IP address of the HTTP request is replaced with an IP address of the AC instead of an IP address of the AP;
an authenticator configured to control via MAC address authentication of the mobile station through communication with an authentication server over a network so that the authentication server starts accounting in response to the MAC address of the mobile station received by the authentication server from the AC being found in a database at the authentication server, and configured to permit association of the mobile station with the AP; and
an accounting processor configured to transmit, to the authentication server, accounting information received from the AP to which the mobile station is connected and wherein the authentication ser1 and ver processes statistics of the received accounting information for the mobile station.

10. The AC of claim 9, wherein, prior to the HTTP request from the mobile station, the authenticator is further configured to receive, from the AP, an association request of the mobile station, to assign the IP address to the mobile station and to receive a failure notification from the authentication server for the MAC address authentication of the mobile station through communication with the authentication server, and in response to the received failure notification, the AP is configured to redirect the HTTP request to the web server.

11. The AC of claim 9, wherein the AC is in a different subnet from the AP.

* * * * *